US012627734B2

(12) United States Patent
Zhang et al.

(10) Patent No.: US 12,627,734 B2
(45) Date of Patent: May 12, 2026

(54) SHARING SYSTEM BASED ON MULTIPLE DEVICE NODES AND METHOD AND STORAGE MEDIUM

(71) Applicant: SUZHOU METABRAIN INTELLIGENT TECHNOLOGY CO., LTD., Suzhou (CN)

(72) Inventors: Shihui Zhang, Suzhou (CN); Shuai Zhao, Suzhou (CN); Qinglin Liu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 114 days.

(21) Appl. No.: 18/850,552

(22) PCT Filed: Jun. 19, 2023

(86) PCT No.: PCT/CN2023/101165
§ 371 (c)(1),
(2) Date: Sep. 24, 2024

(87) PCT Pub. No.: WO2024/113771
PCT Pub. Date: Jun. 6, 2024

(65) Prior Publication Data

US 2025/0220077 A1      Jul. 3, 2025

(30) Foreign Application Priority Data

Nov. 30, 2022    (CN) .......................... 202211533650.3

(51) Int. Cl.
| | |
|---|---|
| *G06F 15/16* | (2006.01) |
| *H04L 67/1095* | (2022.01) |
| *H04L 67/1097* | (2022.01) |

(52) U.S. Cl.
CPC ...... *H04L 67/1097* (2013.01); *H04L 67/1095* (2013.01)

(58) Field of Classification Search
CPC ........................ H04L 67/1097; H04L 67/1095
See application file for complete search history.

(56) References Cited

U.S. PATENT DOCUMENTS 5,572,528 A * 11/1996 Shuen ................. H04L 12/4604
                                                               370/402
10,084,647 B2     9/2018 Wei
                        (Continued)

FOREIGN PATENT DOCUMENTS

| CN | 103139018 A | 6/2013 |
|---|---|---|
| CN | 104579695 A | 4/2015 |
| | (Continued) | |

OTHER PUBLICATIONS

Chen et al., "A Distributed Persistent Memory File System Based on RDMA Multicast," Journal of Computer Research and Development 58(2): pp. 384-396 (2021), with English abstract.
(Continued)

*Primary Examiner* — Normin Abedin
(74) *Attorney, Agent, or Firm* — Merchant & Gould P.C.

(57) ABSTRACT

Disclosed is a sharing system based on multiple device nodes. The sharing system comprises: a host and a storage system, and host and each device node each are configured with a shared network card; where each device node comprises: a storage network device, where storage network device is configured to control a local device node to broadcast interconnection information to another device node in storage system, and establish, based on response information received by local device node, preset connection between local device node and a target device node; a lossless network device, where lossless network device is configured to manage a network environment of storage
(Continued)

Input/output device 108 — Transmission device 106 — Processor 102 — Memory 104 system; and a management device, where management device is configured to synchronize node data of local device node from shared network card to a shared network card of target device node, and manage preset connection between local device node and target device node.

20 Claims, 4 Drawing Sheets

(56)        References Cited

U.S. PATENT DOCUMENTS

| | | | |
|---|---|---|---|
| 10,725,941 B2 | 7/2020 | Subbarao et al. | |
| 11,886,940 B2 * | 1/2024 | Han | H04L 67/60 |
| 11,968,260 B2 * | 4/2024 | Han | H04L 69/40 |
| 2004/0218580 A1 * | 11/2004 | Bahl | H04W 8/245 |
| | | | 370/350 |
| 2015/0212760 A1 | 7/2015 | Goel et al. | |
| 2023/0300422 A1 * | 9/2023 | Mendell | G07F 17/3211 |
| | | | 725/32 |

FOREIGN PATENT DOCUMENTS

| | | | |
|---|---|---|---|
| CN | 107257291 A | 10/2017 |
| CN | 111433732 A | 7/2020 |
| CN | 113485823 A | 10/2021 |
| CN | 114090274 A | 2/2022 |
| CN | 115033521 A | 9/2022 |
| CN | 115623018 A | 1/2023 |
| WO | 2024113771 A1 | 6/2024 |

OTHER PUBLICATIONS

Chinese Search Report for Chinese Patent Application No. 2022115336503 (1 of 2).
Chinese Search Report for Chinese Patent Application No. 2022115336503 (2 of 2).
International Search Report and Written Opinion for International Application No. PCT/CN2023/101165 mailed Sep. 20, 2023, with English translation of Search Report.

* cited by examiner

SHARING SYSTEM BASED ON MULTIPLE DEVICE NODES AND METHOD AND STORAGE MEDIUM

CROSS-REFERENCE TO RELATED APPLICATION

The present application is a National Stage Application of PCT International Application No. PCT/CN2023/101165 filed on Jun. 19, 2023, which claims priority to Chinese Patent Application 202211533650.3, filed in the China National Intellectual Property Administration on Nov. 30, 2022, the disclosure of which is incorporated herein by reference in its entirety.

TECHNICAL FIELD

The disclosure relates to the technical field of data processing, and in particular to a sharing system based on multiple device nodes, a sharing method based on multiple device nodes and a non-volatile readable storage medium.

BACKGROUND

With the development of Internet, cloud computation, Internet of things, mobile Internet, etc., data grow explosively. Moreover, new challenges are presented to conventional data transmission networks. In the face of high-performance computation, big data analysis, and surge type input/output (IO) applications with high concurrency and low delay, a current transmission control protocol/Internet protocol (TCP/IP) hardware and software architecture and a technical feature of applying high central processing unit (CPU) consumption cannot satisfy demands of applications at all.

In the related art, remote direct memory access (RDMA) can directly transfer data from a memory of one computer to another computer in a messaging passing through kernel (MPTK) manner, without intervention of both operating systems. Therefore, low latency, low CPU overhead, and a high bandwidth are realized. To be compatible with an existing Ethernet network, RDMA over Ethernet (ROCE) is developed on top of the RDMA, which wins an RDMA technology substantial development. However, owing to the unreliable Ethernet, it is impossible for device nodes on each network to perceive network transmission clogging or congestion, and network handover. In consequence, new challenges are presented to a storage system having high requirements on delay, bandwidth, and fault management.

No effective solution to the above problems has been provided yet.

SUMMARY

A sharing system based on multiple device nodes is provided in an example of the disclosure, so as to at least solve the technical problem that in the related art, a storage system cannot enable multiple device nodes thereof to share a remote direct memory access (RDMA) over an Ethernet (ROCE) network card with high performance.

In an aspect, a sharing system based on multiple device nodes is provided according to an example of the disclosure. The sharing system comprises: a host, wherein the host is configured with a shared network card; and a storage system, wherein the storage system comprises the multiple device nodes, the multiple device nodes are connected to the host through a router, and each of the multiple device nodes is configured with a shared network card; wherein each of the multiple device nodes comprises: a storage network device, wherein the storage network device is configured to control a local device node to broadcast interconnection information to another device node in the storage system, and establish, based on response information received by the local device node, a preset connection between the local device node and a target device node indicated by a node identifier carried in the response information; a lossless network device, wherein the lossless network device is configured to manage a network environment of the storage system; and a management device, wherein the management device is configured to synchronize node data of the local device node from the shared network card to a shared network card of the target device node, and manage the preset connection between the local device node and the target device node.

Optionally, the device node further comprises: an environment deployment device, wherein the environment deployment device is configured to deploy the network environment after the device node in the storage system is activated.

Optionally, the device node further comprises: a memory management device, wherein the memory management device is configured to apply for a memory from an operating system of the host, and manage apparatus memories of each apparatuses in the storage network device, the lossless network device, and the management device that share the shared network card.

Optionally, the storage network device comprises: a port address management apparatus, wherein the port address management apparatus is configured to manage an address of a preset port of the local device node, and monitor a port number of the preset port, and the preset port is a port for data transmission between the local device node and the another device node; and a port information management apparatus, wherein the port information management apparatus is configured to synchronize information of the preset port of the local device node to the another device node, and register protocol information of a communication protocol at the local device node.

Optionally, the storage network device further comprises: a broadcast apparatus, wherein the broadcast apparatus is configured to broadcast the interconnection information to the another device node at a preset interval period and receive the response information broadcast by the another device node in a preset interval period; the interconnection information and the response information comprise at least one of the following: port information, protocol information, address information, and network information; and a type of broadcasting the interconnection information is divided into first multicast and second multicast, wherein the first multicast is configured to discover the another device node from a first-type network, and the second multicast is configured to discover the another device node from a second-type network.

Optionally, the storage network device further comprises: a connection management apparatus, wherein the connection management apparatus is configured to identify a to-be-connected device node based on the response information received by the broadcast apparatus, and establish the preset connection between the local device node and the to-be-connected device node; and break the preset connection between the local device node and the target device node in a case that the target device node having a preset connection relation with the local device node is offline.

Optionally, the connection management apparatus initiates the preset connection through a manner as follows:

receiving, through a discovery process, the response information notified by a daemon process, and notifying the router that the local device node is in an online state; receiving, through the discovery process, information that the another device node is online, and notifying the daemon process that the another device node is online; and determining, through the daemon process, whether the another device node is configured with a discovery sub-net, determining whether an address of the another device node belongs to the discovery sub-net in a case that the another device node is configured with the discovery sub-net, querying the response information of the another device node in a case that the address of the another device node belongs to the discovery sub-net, and initiating the preset connection to the another device node based on the response information queried.

Optionally, the storage network device further comprises: a multi-queue management apparatus, wherein the multi-queue management apparatus is configured to remotely manage a memory data access queue of the local device node, and provide a data transmission interface for a dynamic link management apparatus of the management device; and the dynamic link management apparatus is configured to manage the preset connection between the local device node and the another device node and a connection between the local device node and the host.

Optionally, the storage network device further comprises: a communication protocol management apparatus, wherein the communication protocol management apparatus is configured to manage a communication protocol of the local device node, transmit a protocol instruction of the communication protocol, receive a protocol state of the communication protocol, and perform data transmission and protocol processing based on the protocol instruction.

Optionally, the lossless network device comprises: a data packet length adjustment apparatus, wherein the data packet length adjustment apparatus is configured to adjust a maximum number of bytes of a data packet transmitted through the preset connection associated with the local device node.

Optionally, the lossless network device further comprises: a flow isolation apparatus, wherein the flow isolation apparatus is configured to divide a preset port of the local device node into different regions, and perform flow isolation through the different regions.

Optionally, the lossless network device further comprises: a flow control apparatus, wherein the flow control apparatus is configured to update flow configuration information of a preset port of the local device node; and a congestion control apparatus, wherein the congestion control apparatus is configured to update congestion configuration information of the preset port of the local device node.

Optionally, the management device comprises: a port information identification apparatus, wherein the port information identification apparatus is configured to describe port information of the local device node, identify a preset port of the another device node, and determine whether the preset port of the another device node belongs to the same device node.

Optionally, the management device further comprises: a node information synchronization apparatus, wherein the node information synchronization apparatus is configured to synchronize the node data to a cluster control apparatus of the local device node and a cluster control apparatus of the target device node; and the node data comprise address information, port information, protocol information, and configuration information.

Optionally, the management device further comprises: an event management apparatus, wherein the event management apparatus is configured to synchronize data between the node information synchronization apparatus and the cluster control apparatus, and synchronize data of the cluster control apparatus of the local device node to the cluster control apparatus of the target device node; and receive data synchronized by an event management apparatus of the target device node, and notify the cluster control apparatus of the local device node and the node information synchronization apparatus.

Optionally, the management device further comprises: a dynamic link management apparatus, wherein the dynamic link management apparatus is configured to manage the preset connection between the local device node and the another device node and a connection between the local device node and the host; handover to a backup link is performed in a case that any one of the preset connections is broken, the node data are synchronized to a peer device node of the local device node in a case that there is no backup link, the cluster control apparatus is notified of information that there is no backup link through the peer device node, and the information that there is no backup link is synchronized to the event management apparatus through the cluster control apparatus; and host information is acquired from the node data in the cluster control apparatus in a case that the event management apparatus receives the information that there is no backup link, and connection to a host indicated by the host information is initiated.

In another aspect, a sharing method based on multiple device nodes, applied to a sharing system is provided according to an example of the disclosure, wherein the sharing system comprises: a host, wherein the host is configured with a shared network card; and a storage system, wherein the storage system comprises multiple device nodes, the multiple device nodes are connected to the host through a router, and each of the multiple device nodes is configured with a shared network card; each of the multiple device nodes comprises: a storage network device, a lossless network device, and a management device, wherein the lossless network device is configured to manage a network environment of the storage system; and the method comprises: controlling, by the storage network device, a local device node to broadcast interconnection information to another device node in the storage system, and establishing, based on response information received by the local device node, a preset connection between the local device node and a target device node indicated by a node identifier carried in the response information; and synchronizing, by the management device, node data of the local device node from the shared network card to a shared network card of the target device node, and managing the preset connection between the local device node and the target device node.

Optionally, wherein the controlling, by the storage network device, a local device node to broadcast interconnection information to another device node in the storage system, and establishing, based on response information received by the local device node, a preset connection between the local device node and a target device node indicated by a node identifier carried in the response information comprises: broadcasting, at a preset interval period by a broadcast apparatus in the storage network device, the interconnection information to the another device node and receiving the response information broadcast by the another device node, wherein the interconnection information and the response information comprise at least one of the following: port information, protocol information, address information, and network information; and a type of broadcasting the interconnection information is divided into first multicast and second multicast, wherein the first multicast is configured to discover the another device node from a first-type network, and the second multicast is configured to discover the another device node from a second-type network; and identifying, by a connection management apparatus in the storage network device, a to-be-connected device node based on the response information received by the broadcast apparatus, and establishing a preset connection between the local device node and the to-be-connected device node.

Optionally, wherein the establishing, based on response information received by the local device node, a preset connection between the local device node and a target device node indicated by a node identifier carried in the response information comprises: receiving, by a connection management apparatus in the storage network device through a discovery process, the response information notified by a daemon process, and notifying the router that the local device node is in an online state; receiving, by the connection management apparatus through the discovery process, online information of the another device node, and notifying the daemon process that the another device node is online; determining, by the connection management apparatus through the daemon process, whether the another device node is configured with a discovery sub-net, and determining whether an address of the another device node belongs to the discovery sub-net in a case that the another device node is configured with the discovery sub-net; and querying, by the connection management apparatus, the response information of the another device node in a case that the address of the another device node belongs to the discovery sub-net, and initiating the preset connection to the another device node based on the response information queried.

Optionally, wherein the managing the preset connection between the local device node and the target device node comprises: performing handover to a backup link in a case that any one of the preset connections is broken, synchronizing the node data to a peer device node of the local device node in a case that there is no backup link, notifying a cluster control apparatus of information that there is no backup link through the peer device node, and synchronizing the information that there is no backup link to an event management apparatus through the cluster control apparatus; and acquiring host information from the node data in the cluster control apparatus in a case that the event management apparatus receives the information that there is no backup link, and initiating connection to a host indicated by the host information.

In another aspect, a non-volatile readable storage medium, storing a computer program, wherein when executed by a processor, the computer program implements steps of the sharing method based on multiple device nodes is provided according to an example of the disclosure.

The sharing system based on multiple device nodes is provided in the disclosure. The sharing system comprises: the host, wherein the host is configured with the shared network card; and the storage system, wherein the storage system comprises multiple device nodes, the multiple device nodes are connected to the host through the router, and each of the multiple device nodes is configured with the shared network card; wherein each of the multiple device nodes comprises: the storage network device, wherein the storage network device is configured to control the local device node to broadcast the interconnection information to the another device node in the storage system, and establish, based on the response information received by the local device node, the preset connection between the local device node and the target device node indicated by the node identifier carried in the response information; the lossless network device, wherein the lossless network device is configured to manage the network environment of the storage system; and the management device, wherein the management device is configured to synchronize the node data of the local device node from the shared network card to the shared network card of the target device node, and manage the preset connection between the local device node and the target device node. According to an example of the disclosure, the storage network device, the lossless network device, the management device, etc. can be added in each of the multiple device nodes in the storage system. Therefore, automatic connection between the multiple device nodes in the storage system can be realized, network congestion, clogging, etc. can be managed by managing the network environment of the storage system, and automatic link handover function can be realized when one device node fails by managing the preset connection between the multiple device nodes. Accordingly, the ROCE network card is shared to a server host under the multi-control device nodes, and the technical problem that in the related art, the storage system cannot enable the multiple device nodes thereof to share the ROCE network card with high performance is solved.

BRIEF DESCRIPTION OF THE DRAWINGS

The accompanying drawings described herein are used for providing detailed understanding of examples the disclosure as a constituent part of the disclosure. Illustrative examples of the disclosure and their descriptions serve to explain the disclosure, instead of limiting the disclosure improperly. In the accompanying drawings.

DETAILED DESCRIPTION OF THE EMBODIMENTS

Figure 1:
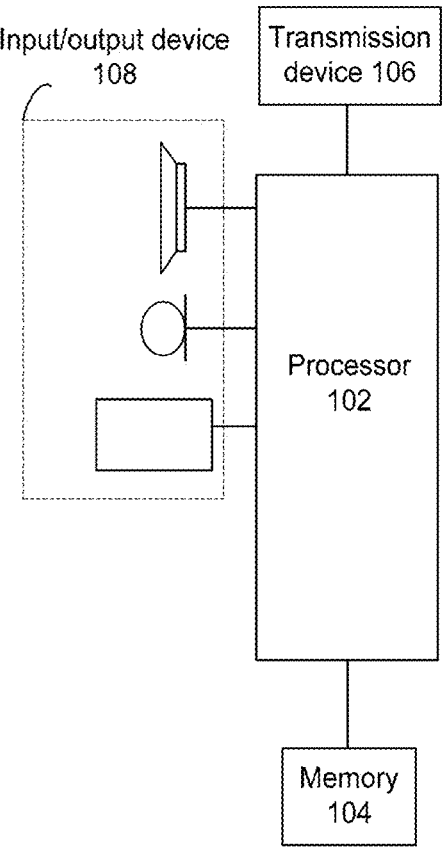
FIG. 1 is a structural block diagram of hardware of a mobile terminal of a sharing system based on multiple device nodes according to an example of the disclosure.

To enable those skilled in the art to better understand solutions in examples of the disclosure, the technical solutions in the examples of the disclosure will be clearly and comprehensively described below in conjunction with the accompanying drawings in the examples of the disclosure. Apparently, the examples described are merely some examples rather than all examples of the disclosure. Based on the examples of the disclosure, all other examples derived by those of ordinary skill in the art without creative efforts should fall within the scope of protection of the examples of the disclosure.

It should be noted that the terms "first", "second", etc. in the description of the examples, the claims, and the above accompanying drawings of the disclosure are used to distinguish between similar objects, instead of necessarily describing a specific sequence or a successive order. It should be understood that data used in this way can be interchanged wherein appropriate, so that the examples of the disclosure described herein can be implemented in other sequences than those illustrated or described herein. In addition, the terms "comprise", "include", "have", and their any variations are intended to cover non-exclusive inclusions. For example, a process, a method, a system, a product, or a device encompassing a series of steps or units can comprise other steps or units that are not explicitly listed or are inherent to the process, method, product, or device, without being limited to those steps or units explicitly listed.

To enable those skilled in the art to understand the examples of the disclosure conveniently, some terms or nouns involved in all the examples of the disclosure are explained as follows:

DMA (Direct Memory Access): primarily configured to solve a problem of a memory transfer speed of a central processing unit (CPU).

RDMA (Remote Direct Memory Access): generated to solve a data processing delay between a client and a server in a network transmission.

ROCE (RDMA over Ethernet): allowing execution of a network protocol of the RDMA over the Ethernet.

DHCP (Dynamic Host Configuration Protocol): primarily responsible for application and allocation management of an Internet protocol (IP) address of each computer in a local area network.

LLDP (Link Layer Discovery Protocol): providing a standard link layer discovery manner, so that a main capacity, a management address, a device identifier, an interface identifier, etc. of a local device can be organized into different types/lengths/values (TLVs), encapsulated in a link layer discovery protocol data unit (LLDPDU), and released to its directly-connected neighbors.

PFC: Priority Flow Control.

ECN: Explicit Congestion Notification.

SCM: SAN Cluster Manager (internal), wherein the SAN indicates a storage area network.

DCM: Dynamic Connect Manage.

CEM: Cluster Event Manage, configured to manage a cluster event and synchronize cluster information.

NVMF: Non Volatile Memory Express over Fabric: an extension of an NVMe protocol in other transmission media, which is configured to indicate a non-volatile memory express (NVMe) over ROCE in the example of the disclosure.

An example of a sharing system based on multiple device nodes according to an example of the disclosure can be executed in a mobile terminal, a computer terminal, etc. With running on the mobile terminal as an example, FIG. 1 is a structural block diagram of hardware of a mobile terminal of a sharing system based on multiple device nodes according to an example of the disclosure. As shown in FIG. 1, the mobile terminal can comprise one or more (only one is shown in FIG. 1) processors 102 (the processors 102 can comprise, but are not limited to, a microcontroller unit (MCU) or a field programmable gate array (FPGA), etc.) and a memory 104 configured to store data, wherein the above mobile terminal can further comprise a transmission device 106 configured as a communication function and an input/output device 108. Those of ordinary skill in the art can understand that the structure shown in FIG. 1 is merely illustrative, and does not limit the structure of the above mobile terminal. For example, the mobile terminal can further comprise more or fewer components than those shown in FIG. 1, or have a configuration differing from that shown in FIG. 1.

The memory 104 can be configured to store a computer program, for example, a software program and a module of application software, such as a computer program corresponding to the sharing system based on multiple device nodes in the example of the disclosure. The processor 102 runs the computer program stored in the memory 104, so as to execute various functional applications and data processing, that is, realize the above sharing system based on multiple device nodes. The memory 104 can comprise a high-speed random access memory, and can further comprise a non-volatile memory, such as one or more magnetic storage apparatuses, flash memories, or other non-volatile solid-state memories. In some instances, the memory 104 can further comprise memories remotely configured relative to the processor 102. These remote memories can be connected to the mobile terminal through a network. The instances of the network comprise, but are not limited to, the Internet, an intranet, a local area network, a mobile communication network, and their combinations.

The transmission device 106 is configured to receive or transmit data via one network. The optional instance of the above network can comprise a wireless network provided by a communication provider of the mobile terminal. In an instance, the transmission device 106 comprises a network interface controller (NIC), which can be connected to other network devices through a base station, so as to communicate with the Internet. In an instance, the transmission device 106 can be a radio frequency (RF) module, which is configured to communicate with the Internet wirelessly.

A method for sharing a ROCE network card by a front-end host based on multi-control device nodes is provided in an example of the disclosure. Modules such as network management, IP management, lossless network control, automatic device discovery management, and dynamic link management are added in an original storage system, so as to realize management of network congestion and clogging, automatic discovery of a host device and the device node, automatic connection of the device node, dynamic link management of the device node and a server host, and automatic ROCE link handover generated when the device node fails. Therefore, the ROCE network card is shared to the server host under the multi-control device nodes, and reliability of storage system is improved.

The examples of the disclosure are described in detail below in conjunction with various examples.

Example 1

An example of the sharing system based on multiple device nodes running on the above mobile terminal is provided according to the example of the disclosure. It should be noted that the steps illustrated in the flowchart of the accompanying drawing can be executed in a computer system such as a set of computer-executable instructions. Moreover, although a logical sequence is shown in the flowchart, in some cases, the steps illustrated or described can be executed in a sequence different from that herein.

Figure 2:
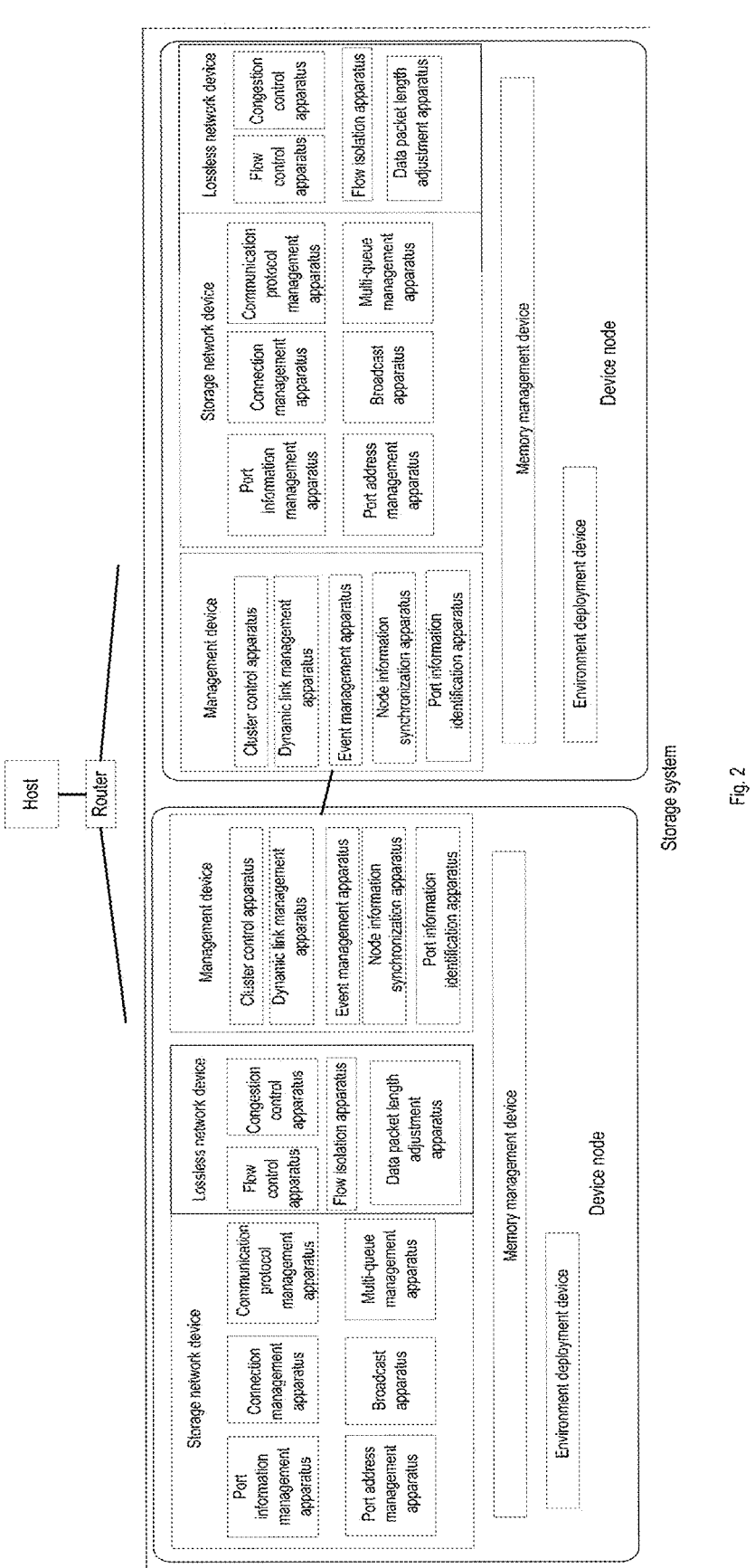
FIG. 2 is a schematic diagram of an optional sharing system based on multiple device nodes according to an example of the disclosure.

FIG. 2 is a schematic diagram of an optional sharing system based on multiple device nodes according to an example of the disclosure. As shown in FIG. 2, the sharing system comprises a host, a router, and a storage system. The storage system comprises: the multiple device nodes, wherein each of the multiple device nodes comprises: a storage network device (Nvme over RDMA), a lossless network device (lossless), a management device, an environment deployment device, and a memory management device (memory manage). The storage network device comprises: a port address management apparatus (IP manage), a port information management apparatus (port manage), a broadcast apparatus (LLDP/DHCP), a connection management apparatus (discovery manage), a multi-queue management apparatus (multi queue), and a communication protocol management apparatus (IO manage). The lossless network device comprises: a data packet length adjustment apparatus (maximum transmission unit (MTU)), a flow isolation apparatus (virtual local area network (VLAN)), a flow control apparatus (PFC), and a congestion control apparatus (ECN). The management device comprises: a port information identification apparatus (virtual product description (VPD)), a node information synchronization apparatus (agent), an event management apparatus (CEM), a cluster control apparatus (SCM), and a dynamic link management apparatus (DCM).

In the example, the host is configured with a shared network card (i.e., the ROCE network card), each of the multiple device nodes in the storage system is connected to the host through the router, each of the multiple device nodes is configured with a shared network card, and all device nodes connected to the same host are regarded as the same framework nodes.

In the example, the storage network device of the device node can be configured to control a local device node to broadcast interconnection information (such as port information, protocol information (NVMe qualified name (NQN)), IP address information (Internet protocol address), and network information (VLAN)) to another device node in the storage system, and establish, according to response information (which is identical to information carried in the interconnection information) received by the local device node, a preset connection (i.e., an NVMF protocol connection) between the local device node and a target device node indicated by a node identifier carried in the response information.

In the example, the lossless network device can be configured to update environment information (such as a number of link transmission bytes, a division region, and port configuration) of a network environment (i.e., a pre-deployed RDMA-related environment) of the storage system. The management device can be configured to synchronize node data of the local device node from the shared network card to a shared network card of the target device node, and manage the preset connection between the local device node and the target device node.

In the example, optionally, the device node further comprises: an environment deployment device, where the environment deployment device is configured to deploy the network environment after the device node in the storage system is activated.

In the example, further optionally, the device node further comprises: a memory management device, wherein the memory management device is configured to apply for a memory from an operating system of the host, and manage apparatus memories of each apparatus in the storage network device, the lossless network device, and the management device that share the shared network card.

In the example of the disclosure, when the device node in the storage system is activated, the environment deployment device can deploy the RDMA-related environment (i.e., the network environment, such as open fabrics enterprise distribution (OFED) and RDMA_CORE). Then, the memory management device can apply for the memory from the operating system (OS) of the host, and manage each module inside ROCE sharing (i.e., manage the apparatus memories of each apparatus in the storage network device, the lossless network device, and the management device sharing the shared network card).

Optionally, the storage network device comprises: a port address management apparatus, wherein the port address management apparatus is configured to manage an address of a preset port of the local device node, and monitor a port number of the preset port, and the preset port is a port for data transmission between the local device node and the another device node; and a port information management apparatus, wherein the port information management apparatus is configured to synchronize information of the preset port of the local device node to the another device node, and register protocol information of a communication protocol at the local device node.

In the example of the disclosure, the port address management apparatus (i.e. IP manage) is configured to configure, delete, and manage an IP address of each ROCE port (i.e. the preset port) of the device node, and monitor the port number of the preset port (such as a nvme over roce port), wherein the preset port is the port for data transmission between the local device node and the another device node.

The port information management apparatus (i.e. port manage) is configured to manage an ROCE network port (i.e. a physical port), identify and create information of the ROCE port (i.e. the information of the preset port), synchronize the information of the ROCE port of the local device node to each device node (i.e., synchronize the information of the preset port of the local device node to the another device node), and register the protocol information (i.e., NON information) of the communication protocol (such as an NVMF protocol) at the local device node. Therefore, local NON information can be broadcast through the LLDP, so that the host can discover the device node, and the device nodes can discover one another.

Optionally, the storage network device further comprises: the broadcast apparatus, wherein the broadcast apparatus is configured to broadcast the interconnection information to the another device node at a preset interval period and receive the response information broadcast by the another device node; the interconnection information and the response information comprise at least one of the following: port information, protocol information, address information, and network information; and a type of broadcasting the interconnection information is divided into first multicast and second multicast, wherein the first multicast is configured to discover the another device node from a first-type network, and the second multicast is configured to discover the another device node from a second-type network.

In the example, further optionally, the storage network device further comprises: the connection management apparatus, wherein the connection management apparatus is configured to identify a to-be-connected device node based on the response information received by the broadcast apparatus, and establish the preset connection between the local device node and the to-be-connected device node; and break the preset connection between the local device node and the target device node in a case that the target device node having a preset connection relation with the local device node is offline.

In the example of the disclosure, the broadcast apparatus (i.e. LLDP/DHCP) is configured to broadcast the interconnection information (including: the port information, protocol information, the address information, the network information, etc.) to the another device node at the preset interval period (which can be set according to actual conditions) and receive the response information (including: port information, protocol information, address information, network information, etc., which are identical to the information carried in the interconnection information) broadcast by the another device node. Optionally, the LLDP/DHCP function as follows: the DHCP is configured to automatically configure an IP (i.e. an IP address of the ROCE port) in an environment supporting the DHCP, so as to reduce deployment steps. The LLDP is configured to multicast (i.e. broadcast) local interconnection information, such as a port, NON, IP, and VLAN configured for node interconnection, and a port, NON information, IP, VLAN interconnected to the host. Moreover, the LLDP can receive and process interconnection information of the another device node in the network, and initiate connection, so as to facilitate communication between the device nodes. The LLDP can transmit the local interconnection information regularly, so as to discover, in the network in time, the condition that the local device node is online or offline.

In the example of the disclosure, the type of broadcasting the interconnection information is divided into the first multicast (i.e. media access control (MAC) multicast) and the second multicast (i.e. IP multicast), wherein the first multicast is configured to discover the another device node from the first-type network (i.e. a layer-2 network), and the second multicast is configured to discover the another device node from the second-type network (i.e. a layer-3 network). Optionally, MAC multicast: primarily configured to discover the device node in the layer-2 network. A local IP address, port number, protocol type, NON, etc. are multicast out through a multicast address of the LLDP, so that the another device node in the network can acquire information that the local device node is online. Moreover, the local device node also receives an IP address, port number, protocol type, NON, etc. from the another device node, stores NVMF node information (i.e. the interconnection information) of the another device node locally, and transmits filtered information to a main program in a form of a message queue. To acquire information that the another device node is offline, an aging time of the NON, etc. is set. When there is no NON information corresponding to the device node within the aging time, the device node is deleted, and the main program is notified that the device node is offline. To prevent the local device node from aging at the another device node, the local NON information is multicast regularly.

IP multicast: primarily configured to discover devices in the layer-3 network. Differing from the MAC multicast, it is impossible to determine NON information of the device node discovered through the IP multicast. A user is required to configure sub-net information of device nodes to be discovered, so that the device can automatically distinguish nodes to undergo NVMF connection from other nodes, and filter away invalid node information. The sub-net information indicates a sub-net where a node IP is positioned. For example, when the sub-net is 192.168.2.0/24, nodes having IP addresses 192.168.2.1-192.168.2.255 are valid nodes. When receiving the condition that a corresponding node is online, a daemon process initiates the NVMF connection. If the sub-net is 192.168.2.5/32, a device having an IP address 192.168.2.5 is a valid node.

In the example of the disclosure, the connection management apparatus has an automatic discovery management function, so as to identify the to-be-connected device node based on the response information received by the broadcast apparatus, and establish the preset connection between the local device node and the to-be-connected device node; and break the preset connection between the local device node and the target device node in a case that the target device node having a preset connection relation with the local device node is offline (in other words, the automatic discovery management function can discover the another device node in the network and actively establish the connections based on the NON information acquired through the LLDP or by scanning the sub-net configured, and actively break the connection to the another device node when the device node is offline).

In the example of the disclosure, it is automatically discovered that the local interconnection information can be multicast out through the MAC multicast and the IP multicast, the interconnection information from the another device node of the multicast can be received simultaneously, and the NVMF protocol connection to a remote device node can be automatically established.

In the example of the disclosure, it is automatically discovered that a separate node discovery process is configured to acquire necessary NVMF information such as the local IP, port number, protocol type, and NQN, and multicast the information that the node is online or offline; and receive necessary NVMF information such as an IP, port number, protocol type, and NON of the remote node, filter and screen the necessary NVMF information, and transmit filtered and screened necessary NVMF information to a node daemon process, so that the node daemon process initiates or breaks the NVMF protocol connection according to remote information.

Figure 3:
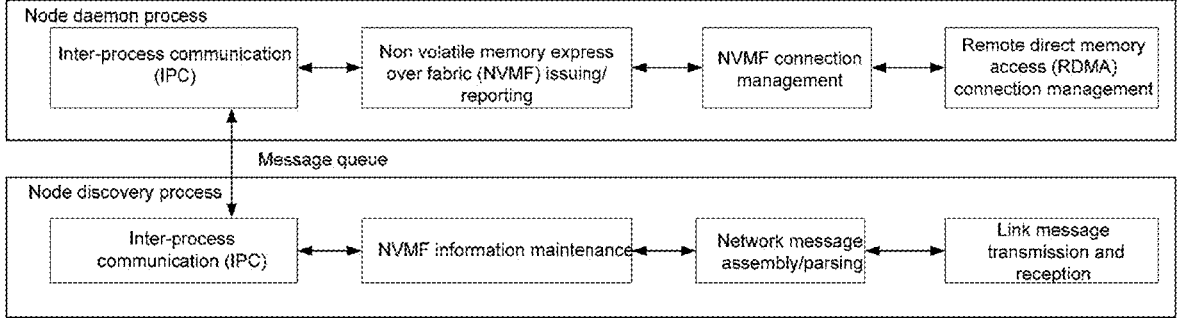
FIG. 3 is a schematic diagram of an optional automatic discovery structure according to an example of the disclosure.

FIG. 3 is a schematic diagram of an optional automatic discovery structure according to an example of the disclosure. As shown in FIG. 3, the automatic discovery structure comprises: a node discovery process and a node daemon process. The node daemon process comprises: inter-process communication (IPC), NVMF information issuing/reporting, NVMF connection management, and RDMA connection management. The node discovery process comprises: inter-process communication (IPC), NVMF information maintenance, network message assembly/parsing, and link message transmission and reception. The node daemon process and the node discovery process perform message queue communication through respective IPC.

Optionally, the connection management apparatus initiates the preset connection through methods as follows: the response information notified by the daemon process is received through the discovery process, and the router is notified that the local device node is in an online state; information that the another device node is online is received through the discovery process, and the daemon process is notified that the another device node is online; and whether the another device node is configured with a discovery sub-net or not is determined through the daemon process, whether an address of the another device node belongs to the discovery sub-net or not is determined in a case that the another device node is configured with the discovery sub-net, the response information of the another device node is queried in a case that the address of the another device node belongs to the discovery sub-net, and the preset connection to the another device node is initiated based on the response information queried.

In the example of the disclosure, optionally, the step that the connection management apparatus can initiate the preset connection can be as follows: the response information notified by the daemon process is received through the discovery process, and the router is notified that the local device node is in the online state; and then, the information that the another device node is online is received through the discovery process, and the daemon process is notified that the another device node is online. And, whether the another device node is configured with the discovery sub-net or not is determined through the daemon process, whether the address of the another device node belongs to the discovery sub-net or not is determined in a case that the another device node is configured with the discovery sub-net, the response information of the another device node is queried in a case that the address of the another device node belongs to the discovery sub-net, and the preset connection to the another device node is initiated based on the response information queried.

Figure 4:
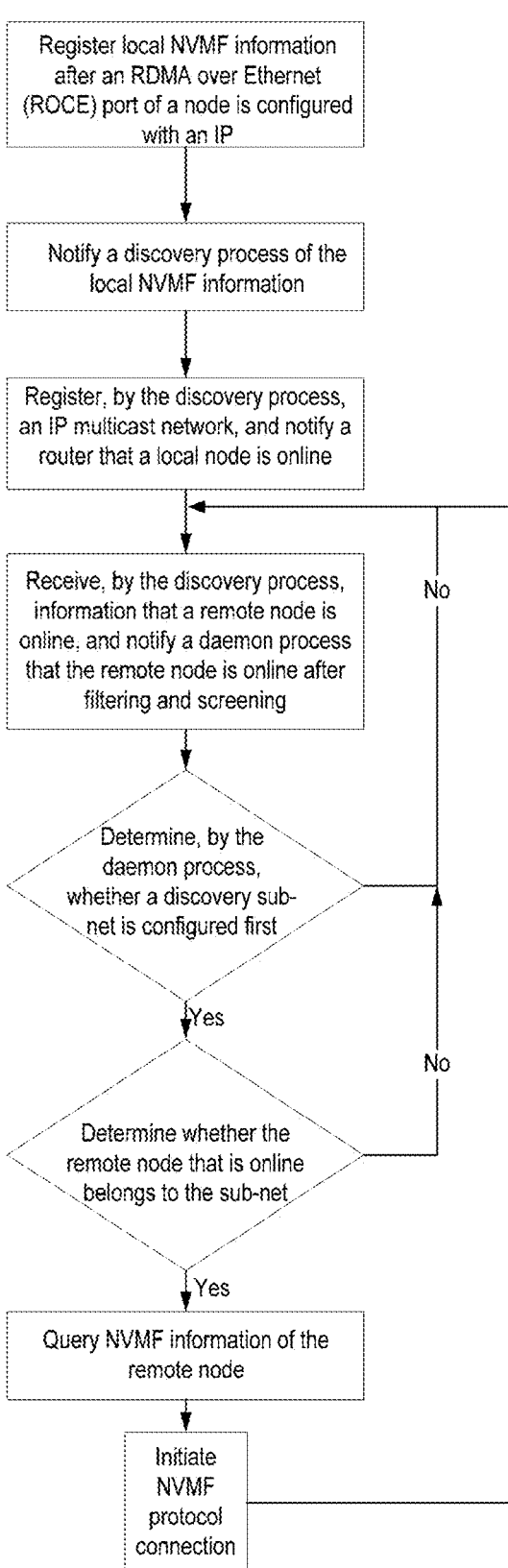
FIG. 4 is a schematic diagram of an optional flow of initiating non volatile memory express over fabric (NVMF) protocol connection according to an example of the disclosure.

FIG. 4 is a schematic diagram of an optional flow of initiating an NVMF protocol connection according to an example of the disclosure. As shown in FIG. 4, the flow comprises:

(1) The local NVMF information is registered after the ROCE port of the node is configured with the IP.

(2) The discovery process is notified of the local NVMF information, the daemon process notifies the IP, port number, protocol type, NON, etc. to the discovery process, and the discovery process is configured to multicast the NVMF information of the node.

(3) The discovery process registers an IP multicast network, and notifies the router that the local node is online.

(4) The discovery process receives the information that the remote node is online, and notifies the daemon process that the remote node is online after filtering and screening.

(5) The daemon process determines whether the discovery sub-net is configured or not first, and if not, (4) is returned directly.

(6) Whether the remote node that is online belongs to the sub-net is determined in a case that the discovery sub-net is configured, and if not, (4) is returned.

(7) The NVMF information, such as the protocol type and NQN of the remote node, is queried in a case that the remote node belongs to the discovery sub-net.

(8) The NVMF protocol connection is initiated after the NVMF information is successfully queried.

Optionally, the storage network device further comprises: the multi-queue management apparatus, wherein the multi-queue management apparatus is configured to remotely manage a memory data access queue of the local device node, and provide a data transmission interface for a dynamic link management apparatus of the management device; and the dynamic link management apparatus is configured to manage the preset connection between the local device node and the another device node and connection between the local device node and the host.

In the example of the disclosure, the multi-queue management apparatus (i.e. the multi queue) can be configured to remotely manage the memory data access queue of the local device node (in other words, an RDMA access queue can be created, deleted, and managed in a lossless multi-queue manner, and IO can be transmitted and received in a lock-free multi-queue manner), and provide a data transmission interface for the dynamic link management apparatus of the management device (in other words, an application programming interface (API) (i.e. the data transmission interface) can be provided for a DCM module for use). The dynamic link management apparatus (the DCM module) is configured to manage the preset connection between the local device node and the another device node and the connection between the local device node and the host.

Optionally, the storage network device further comprises: the communication protocol management apparatus, where the communication protocol management apparatus is configured to manage a communication protocol of the local device node, transmit a protocol instruction of the communication protocol, receive a protocol state of the communication protocol, and perform data transmission and protocol processing based on the protocol instruction.

In the example of the disclosure, the communication protocol management apparatus (i.e. the IO manage) is configured to manage the communication protocol (such as the NVME protocol and the NVMF protocol) of the local device node, transmit the protocol instruction of the communication protocol, receive the protocol state of the communication protocol, and then perform, for example, the data transmission and protocol processing according to the protocol instruction.

Optionally, the lossless network device comprises: the data packet length adjustment apparatus, wherein the data packet length adjustment apparatus is configured to adjust a maximum number of bytes of a data packet transmitted through the preset connection associated with the local device node.

In the example of the disclosure, the data packet length adjustment apparatus (i.e. the maximum transmission unit (MTU), for a maximum number of bytes of a single packet) can adjust the MTU, so as to improve a bandwidth of a link and reduce delay (i.e., the data packet length adjustment apparatus adjusts the maximum number of the bytes of the packet transmitted through the preset connection associated with the local device node, so as to improve the bandwidth of the link and reduce the delay).

Optionally, the lossless network device further comprises: the flow isolation apparatus, where the flow isolation apparatus is configured to divide a preset port of the local device node into different regions, and perform flow isolation through the different regions.

In the example of the disclosure, the flow isolation apparatus (i.e. the VLAN) is configured to divide a network port into different regions, and isolate other ports (in other words, the flow isolation apparatus is configured to divide the preset port of the local device node into different regions, and perform the flow isolation through the different regions). Moreover, it can be used in combination with the PFC module (i.e. the flow control apparatus), so as to realize flow control.

Optionally, the lossless network device further comprises: the flow control apparatus, wherein the flow control apparatus is configured to update flow configuration information of a preset port of the local device node; and a congestion control apparatus, wherein the congestion control apparatus is configured to update congestion configuration information of the preset port of the local device node.

In the example of the disclosure, the PFC module (i.e., the flow control apparatus) supports configuration, modification, and deletion of a PFC configuration of the port (in other words, the flow control apparatus can update the flow configuration information of the preset port of the local device node). The ECN module (i.e., the congestion control apparatus) supports configuration, modification, and deletion of an ECN configuration of the port (in other words, the congestion control apparatus can update the congestion configuration information of the preset port of the local device node). Therefore, a lossy and lossless Ethernet network environment is adapted. Moreover, if the PFC module and the ECN module are used cooperatively, the Ethernet can satisfy lossless network requirements, performance of the ROCE can be improved, and reliability and stability of the nodes in the storage system can be improved.

Optionally, the management device comprises: the port information identification apparatus, wherein the port information identification apparatus is configured to describe port information of the local device node, identify a preset port of the another device node, and determine whether the preset port of the another device node belongs to the same device node.

In the example of the disclosure, the VPD (i.e. the port information identification apparatus) indicates virtual product description and is configured to describe information of the node and the port, so as to facilitate management of the local node. Moreover, the ROCE port can also be distinguished at the remote node, so as to distinguish whether the remote ROCE port is in the same node (which can be used in node management, link redundancy management, dynamic link management, etc.) (in other words, the port information identification apparatus can describe the port information of the local device node, identify the preset port of the another device node, and determine whether the preset port of the another device node belongs to the same device node).

Optionally, the management device further comprises: the node information synchronization apparatus, wherein the node information synchronization apparatus is configured to synchronize the node data to a cluster control apparatus of the local device node and a cluster control apparatus of the target device node; and the node data comprise address information, port information, protocol information, and configuration information.

In the example of the disclosure, the agent (i.e. the node information synchronization apparatus) can synchronize the local information, such as changes in the IP, ROCE port, NON, PFC, and ECN configuration, to a local SCM through the CEM module. Moreover, the CEM synchronizes the information to an SCM of the remote node (in other words, the node information synchronization apparatus can synchronize the node data (comprising the address information, port information, protocol information, configuration information, etc.) to the cluster control apparatus (i.e., the SCM module) of the local device node and the cluster control apparatus of the target device node).

Optionally, the management device further comprises: the event management apparatus, wherein the event management apparatus is configured to synchronize data between the node information synchronization apparatus and the cluster control apparatus, and synchronize data of the cluster control apparatus of the local device node to the cluster control apparatus of the target device node; and receive data synchronized by an event management apparatus of the target device node, and notify the cluster control apparatus of the local device node and the node information synchronization apparatus.

In the example of the disclosure, the CEM module (i.e. the event management apparatus) can synchronize the agent (AGT) and the SCM module, and synchronize data of the AGT and the SCM in a form of an event (in other words, the event management apparatus can synchronize the data between the node information synchronization apparatus and the cluster control apparatus), and synchronize data of a local SCM to the SCM of the remote node simultaneously (in other words, synchronize data of the cluster control apparatus of the local device node to the cluster control apparatus of the target device node), and is also configured to receive an event synchronized by a remote CEM, and notify the local SCM module and an AGT module (in other words, receive data synchronized by the event management apparatus of the target device node, and notify the cluster control apparatus of the local device node and the node information synchronization apparatus).

Optionally, the management device further comprises: the dynamic link management apparatus, wherein the dynamic link management apparatus is configured to manage the preset connection between the local device node and the another device node and a connection between the local device node and the host; handover to a backup link is performed in a case that any one of the preset connections is broken, the node data are synchronized to a peer device node of the local device node in a case that there is no backup link, the cluster control apparatus is notified of information that there is no backup link through the peer device node, and the information that there is no backup link is synchronized to the event management apparatus through the cluster control apparatus; and host information is acquired from the node data in the cluster control apparatus in a case that the event management apparatus receives the information that there is no backup link, and connection to a host indicated by the host information is initiated.

In the example of the disclosure, the dynamic link management apparatus (i.e. the DCM module) is configured to manage links with the host and the node (in other words, the dynamic link management apparatus is configured to manage the preset connection between the local device node and the another device node and the connection between the local device node and the host). Handover to the backup link is automatically performed in a case that one link is broken, (in other words, handover to the backup link is performed in a case that any one of the preset connections is broken). The local information can be synchronized to a peer node in the same framework in a case that there is no backup link, and the peer node notifies the SCM that there is no link at the node. The SCM synchronizes the information to the DCM (in other words, the node data are synchronized to the peer device node of the local device node in a case that there is no backup link, the cluster control device is notified of the information that there is no backup link through the peer device node, and the information that there is no backup link is synchronized to the event management apparatus through the cluster control apparatus). Link breakage information can be acquired through the LLDP/DHCP module (i.e. the broadcast apparatus). Before losing power, the local node transmits a message to notify the peer node in the same framework. When receiving a message that the peer node is offline and there is no backup link, the DCM acquires the host information from the SCM, and automatically initiates connection to the host (in other words, in a case of receiving the information that there is no backup link, the event management apparatus acquires the host information from the node data in the cluster control apparatus, and initiates the connection to the host indicated by the host information), and automatically hands over the link without being perceived by the host. Therefore, the ROCE network card is shared.

In the example of the disclosure, the ROCE-NVME supporting information (i.e., the interconnection information) of the local node can be managed through the network management, IP management, port management, etc. Local ROCE-NVME information can be broadcast and the information of the remote node information can be received through the automatic discovery module using the principles of the MAC multicast and the IP multicast. Therefore, the connection to another node or the host can be discovered, established, and broken rapidly. Moreover, the node device in the layer-2 network can be discovered in the MAC multicast manner, and the node device in the layer-3 network can be discovered in the IP multicast mode. Therefore, the disclosure can be adapted to various network environments, reducing environment deployment requirements and steps. The node in the storage system can be adapted to various network environments through the modules such as the VLAN, PFC, and ECN. In addition, the VPD and the agent assist in managing the information of the node. The CEM module synchronizes the information to the SCM of the node and SCM of other nodes in the cluster. The SCM can manage information of all nodes in the cluster. Accordingly, the DCM module can acquire information of a host connected to an offline node through the SCM when one node is offline, automatically initiate the connection to the host, and automatically hand over the link, so that the ROCE network card is shared.

In the above examples of the disclosure, the description of each example has its own emphasis. Reference can be made to the relevant description of other examples for the part not described in detail in one example.

In the examples provided in the disclosure, it should be understood that the disclosed technical contents can be implemented in other ways. The apparatus examples described above are merely illustrative. For example, the units are divided merely by logic function. Other division methods can be employed during practical implementation. For example, multiple units or components can be combined or integrated into another system. Alternatively, some features can be omitted or can not be executed. Further, mutual coupling, direct coupling, or communication connection shown or discussed can be indirect coupling or communication connection through some interfaces, units, or modules in an electrical manner, etc.

The unit described as a separate component can be physically separated or not. The component shown as a unit can be a physical unit or not. That is, the components can be positioned in one place or distributed over a plurality of units. Some or all units can be selected as required actually to implement the solution in the example.

In addition, all function units in each example of the disclosure can be integrated into one processing unit. Each unit can also be physically present alone. Two or more units can also be integrated into one unit. The above integrated units can be implemented in a form of hardware or software function units.

If being implemented in the form of software function units and sold or used as independent products, the integrated units can be stored in a non-volatile readable storage medium. Based on such understanding, the technical solutions in the examples of the disclosure in essence, the part that contributes to the related art, or all or some of the technical solutions can be embodied in a form of a software product. The computer software product is stored in one non-volatile readable storage medium and comprises several instructions configured to enable a computer device (which can be a personal computer, a server, or a network device, etc.) to execute all or some of the steps of the method in each example of the disclosure. The foregoing non-volatile readable storage medium comprises: various non-volatile readable storage media capable of storing a program code, such as a universal serial bus (USB) flash disk, a read-only memory (ROM), a random access memory (RAM), a mobile hard disk, a magnetic disk, and an optical disk.

What are described above are merely optional embodiments of the disclosure. It should be pointed out that those of ordinary skill in the art can make several improvements and modifications without departing from the principles in the examples of the disclosure, and these improvements and modifications should also be deemed as falling within the scope of protection the examples of the disclosure.

The invention claimed is:

1. A sharing system based on multiple device nodes, comprising:
   a host, wherein the host is configured with a shared network card; and
   a storage system, wherein the storage system comprises the multiple device nodes, the multiple device nodes are connected to the host through a router, and each of the multiple device nodes is configured with a shared network card; wherein each of the multiple device nodes comprises:
   a storage network device, wherein the storage network device is configured to control a local device node to broadcast interconnection information to another device node in the storage system, and establish, based on response information received by the local device node, a preset connection between the local device node and a target device node indicated by a node identifier carried in the response information;
   a lossless network device, wherein the lossless network device is configured to manage a network environment of the storage system; and
   a management device, wherein the management device is configured to synchronize node data of the local device node from the shared network card to a shared network card of the target device node, and manage the preset connection between the local device node and the target device node.

2. The sharing system according to claim 1, wherein the device node further comprises:
   an environment deployment device, wherein the environment deployment device is configured to deploy the network environment after the device node in the storage system is activated; and/or,
   a memory management device, wherein the memory management device is configured to apply for a memory from an operating system of the host, and manage apparatus memories of each apparatus in the storage network device, the lossless network device, and the management device that share the shared network card.

3. The sharing system according to claim 1, wherein the storage network device comprises:
   a port address management apparatus, wherein the port address management apparatus is configured to manage an address of a preset port of the local device node, and monitor a port number of the preset port, and the preset port is a port for data transmission between the local device node and the another device node; and
   a port information management apparatus, wherein the port information management apparatus is configured to synchronize information of the preset port of the local device node to the another device node, and register protocol information of a communication protocol at the local device node.

4. The sharing system according to claim 1, wherein the storage network device further comprises:
   a broadcast apparatus, wherein the broadcast apparatus is configured to broadcast the interconnection information to the another device node at a preset interval period and receive the response information broadcast by the another device node; the interconnection information and the response information comprise at least one of the following: port information, protocol information, address information, and network information; and a type of broadcasting the interconnection information is divided into first multicast and second multicast, wherein the first multicast is configured to discover the another device node from a first-type network, and the second multicast is configured to discover the another device node from a second-type network.

5. The sharing system according to claim 4, wherein the storage network device further comprises:

a connection management apparatus, wherein the connection management apparatus is configured to identify a to-be-connected device node based on the response information received by the broadcast apparatus, and establish the preset connection between the local device node and the to-be-connected device node; and break the preset connection between the local device node and the target device node in a case that the target device node having a preset connection relation with the local device node is offline.

6. The sharing system according to claim 5, wherein the connection management apparatus initiates the preset connection through a manner as follows: receiving, through a discovery process, the response information notified by a daemon process, and notifying the router that the local device node is in an online state; receiving, through the discovery process, information that the another device node is online, and notifying the daemon process that the another device node is online; and determining, through the daemon process, whether the another device node is configured with a discovery sub-net, determining whether an address of the another device node belongs to the discovery sub-net in a case that the another device node is configured with the discovery sub-net, querying the response information of the another device node in a case that the address of the another device node belongs to the discovery sub-net, and initiating the preset connection to the another device node based on the response information queried.

7. The sharing system according to claim 1, wherein the storage network device further comprises:

a multi-queue management apparatus, wherein the multi-queue management apparatus is configured to remotely manage a memory data access queue of the local device node, and provide a data transmission interface for a dynamic link management apparatus of the management device; and the dynamic link management apparatus is configured to manage the preset connection between the local device node and the another device node and a connection between the local device node and the host.

8. The sharing system according to claim 1, wherein the storage network device further comprises:

a communication protocol management apparatus, wherein the communication protocol management apparatus is configured to manage a communication protocol of the local device node, transmit a protocol instruction of the communication protocol, receive a protocol state of the communication protocol, and perform data transmission and protocol processing based on the protocol instruction.

9. The sharing system according to claim 1, wherein the lossless network device comprises:

a data packet length adjustment apparatus, wherein the data packet length adjustment apparatus is configured to adjust a maximum number of bytes of a data packet transmitted through the preset connection associated with the local device node.

10. The sharing system according to claim 1, wherein the lossless network device further comprises:

a flow isolation apparatus, wherein the flow isolation apparatus is configured to divide a preset port of the local device node into different regions, and perform flow isolation through the different regions.

11. The sharing system according to claim 1, wherein the lossless network device further comprises:

a flow control apparatus, wherein the flow control apparatus is configured to update flow configuration information of a preset port of the local device node; and a congestion control apparatus, wherein the congestion control apparatus is configured to update congestion configuration information of the preset port of the local device node.

12. The sharing system according to claim 1, wherein the management device comprises:

a port information identification apparatus, wherein the port information identification apparatus is configured to describe port information of the local device node, identify a preset port of the another device node, and determine whether the preset port of the another device node belongs to the same device node.

13. The sharing system according to claim 1, wherein the management device further comprises:

a node information synchronization apparatus, wherein the node information synchronization apparatus is configured to synchronize the node data to a cluster control apparatus of the local device node and a cluster control apparatus of the target device node; and the node data comprise address information, port information, protocol information, and configuration information.

14. The sharing system according to claim 13, wherein the management device further comprises:

an event management apparatus, wherein the event management apparatus is configured to synchronize data between the node information synchronization apparatus and the cluster control apparatus; synchronize data of the cluster control apparatus of the local device node to the cluster control apparatus of the target device node; and receive data synchronized by an event management apparatus of the target device node, and notify the cluster control apparatus of the local device node and the node information synchronization apparatus.

15. The sharing system according to claim 14, wherein the management device further comprises:

a dynamic link management apparatus, wherein the dynamic link management apparatus is configured to manage the preset connection between the local device node and the another device node and a connection between the local device node and the host; wherein handover to a backup link is performed in a case that any one of the preset connections is broken, the node data are synchronized to a peer device node of the local device node in a case that there is no backup link, the cluster control apparatus is notified of information that there is no backup link through the peer device node, and the information that there is no backup link is synchronized to the event management apparatus through the cluster control apparatus; and host information is acquired from the node data in the cluster control apparatus in a case that the event management apparatus receives the information that there is no backup link, and connection to a host indicated by the host information is initiated.

16. A sharing method based on multiple device nodes, applied to a sharing system, wherein the sharing system comprises: a host, wherein the host is configured with a shared network card; and a storage system, wherein the storage system comprises multiple device nodes, the multiple device nodes are connected to the host through a router, and each of the multiple device nodes is configured with a shared network card; each of the multiple device nodes comprises: a storage network device, a lossless network device, and a management device, wherein the lossless network device is configured to manage a network environment of the storage system; and the method comprises:

controlling, by the storage network device, a local device node to broadcast interconnection information to another device node in the storage system, and establishing, based on response information received by the local device node, a preset connection between the local device node and a target device node indicated by a node identifier carried in the response information; and synchronizing, by the management device, node data of the local device node from the shared network card to a shared network card of the target device node, and managing the preset connection between the local device node and the target device node.

17. The method according to claim 16, wherein the controlling, by the storage network device, a local device node to broadcast interconnection information to another device node in the storage system, and establishing, based on response information received by the local device node, a preset connection between the local device node and a target device node indicated by a node identifier carried in the response information comprises:

broadcasting, at a preset interval period by a broadcast apparatus in the storage network device, the interconnection information to the another device node and receiving the response information broadcast by the another device node, wherein the interconnection information and the response information comprise at least one of the following: port information, protocol information, address information, and network information; and a type of broadcasting the interconnection information is divided into first multicast and second multicast, wherein the first multicast is configured to discover the another device node from a first-type network, and the second multicast is configured to discover the another device node from a second-type network; and identifying, by a connection management apparatus in the storage network device, a to-be-connected device node based on the response information received by the broadcast apparatus, and establishing a preset connection between the local device node and the to-be-connected device node.

18. The method according to claim 16, wherein the establishing, based on response information received by the local device node, a preset connection between the local device node and a target device node indicated by a node identifier carried in the response information comprises:

receiving, by a connection management apparatus in the storage network device through a discovery process, the response information notified by a daemon process, and notifying the router that the local device node is in an online state;

receiving, by the connection management apparatus through the discovery process, online information of the another device node, and notifying the daemon process that the another device node is online;

determining, by the connection management apparatus through the daemon process, whether the another device node is configured with a discovery sub-net, and determining whether an address of the another device node belongs to the discovery sub-net in a case that the another device node is configured with the discovery sub-net; and querying, by the connection management apparatus, the response information of the another device node in a case that the address of the another device node belongs to the discovery sub-net, and initiating the preset connection to the another device node based on the response information queried.

19. The method according to claim 16, wherein the managing the preset connection between the local device node and the target device node comprises:

performing handover to a backup link in a case that any one of the preset connections is broken, synchronizing the node data to a peer device node of the local device node in a case that there is no backup link, notifying a cluster control apparatus of information that there is no backup link through the peer device node, and synchronizing the information that there is no backup link to an event management apparatus through the cluster control apparatus; and acquiring host information from the node data in the cluster control apparatus in a case that the event management apparatus receives the information that there is no backup link, and initiating connection to a host indicated by the host information.

20. A non-volatile readable storage medium, storing a computer program, wherein when executed by a processor, the computer program implements steps of the sharing method based on multiple device nodes according to claim 16.

* * * * *